(12) United States Patent
Yang

(10) Patent No.: US 11,148,958 B2
(45) Date of Patent: Oct. 19, 2021

(54) DESALINATION DEVICE

(71) Applicant: Yingchen Yang, Rancho Viejo, TX (US)

(72) Inventor: Yingchen Yang, Rancho Viejo, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 16/711,546

(22) Filed: Dec. 12, 2019

(65) Prior Publication Data

US 2020/0189933 A1 Jun. 18, 2020

Related U.S. Application Data

(60) Provisional application No. 62/778,465, filed on Dec. 12, 2018.

(51) Int. Cl.
  *C02F 1/04* (2006.01)
  *C02F 1/08* (2006.01)
  (Continued)

(52) U.S. Cl.
  CPC ............. *C02F 1/047* (2013.01); *C02F 1/043* (2013.01); *C02F 1/08* (2013.01); *C02F 1/10* (2013.01);
  (Continued)

(58) Field of Classification Search
  CPC .. C02F 1/043; C02F 1/047; C02F 1/08; C02F 1/10; C02F 1/14
  See application file for complete search history.

(56) References Cited

U.S. PATENT DOCUMENTS 3,248,306 A * 4/1966 Cummings ............. C02F 1/045
  202/185.2
3,257,291 A * 6/1966 Gerber ...................... C02F 1/10
  202/234

(Continued)

FOREIGN PATENT DOCUMENTS

| CN | 105020919 | 11/2015 |
| ES | 2165824 | 3/2002 |
| RU | 2656515 | 6/1918 |

OTHER PUBLICATIONS

Elimelech and Phillip, "The Future of Seawater Desalination: Energy, Technology, and the Environment," *Science*, 333: 712-717, 2011.

(Continued)

*Primary Examiner* — Jonathan Miller

(57) ABSTRACT

Disclosed are a desalination device and processes of desalination using the device. The device is directly ocean-situated and fully nature-powered with on intake, no brine production, and no electricity consumption. The device contains a heating unit, configured to receive a dry air stream and heat the dry air stream with one or more renewable energy sources to produce a heated air stream; a humidifier, configured to receive the heated air stream, evaporate at least portion of water present in the humidifier and humidify the heated air stream to produce a wet air stream, a cooling unit, configured to receive the wet stream and cool the wet air stream resulting in condensation of at least a portion of the moisture to produce fresh water and a dehumidified air stream; and a fresh water collection tank, configured to collect at least a portion of the fresh water.

17 Claims, 5 Drawing Sheets

(51) Int. Cl.
*C02F 1/10* (2006.01)
*C02F 1/14* (2006.01)
*C02F 103/08* (2006.01)

(52) U.S. Cl.
CPC ............ *C02F 1/14* (2013.01); *C02F 2103/08* (2013.01); *C02F 2201/009* (2013.01)

(56) References Cited

U.S. PATENT DOCUMENTS

| | | | | | |
|---|---|---|---|---|---|
| 3,986,936 | A | * | 10/1976 | Rush | C02F 1/14 202/234 |
| 4,172,767 | A | * | 10/1979 | Sear | C02F 1/047 202/182 |
| 4,187,151 | A | | 2/1980 | Hanning | |
| 4,363,703 | A | * | 12/1982 | ElDifrawi | F24S 10/20 203/10 |
| 5,064,505 | A | * | 11/1991 | Borgren | B01D 3/10 202/202 |
| 5,186,822 | A | | 2/1993 | Tzong et al. | |
| 5,306,397 | A | | 4/1994 | Schmidt | |
| 6,440,275 | B1 | * | 8/2002 | Domen | C02F 1/14 202/234 |
| 7,328,584 | B2 | | 2/2008 | Craven | |
| 7,431,806 | B2 | * | 10/2008 | Levine | B01D 3/10 203/10 |
| 7,948,101 | B2 | * | 5/2011 | Burtch | F03B 13/1815 290/44 |
| 9,878,265 | B2 | * | 1/2018 | Hendrix | F03D 9/25 |
| 2004/0084357 | A1 | * | 5/2004 | Nagler | C02F 1/18 210/85 |
| 2006/0180460 | A1 | * | 8/2006 | Nagler | B01D 3/42 202/234 |
| 2006/0260312 | A1 | * | 11/2006 | Ingersoll | F03D 9/17 60/641.1 |
| 2009/0200151 | A1 | * | 8/2009 | Whisson | C02F 1/14 202/185.1 |
| 2010/0032280 | A1 | * | 2/2010 | Akers | B01D 5/006 203/10 |
| 2010/0037651 | A1 | * | 2/2010 | Corl | C02F 1/041 62/513 |
| 2011/0056822 | A1 | * | 3/2011 | Elsharqawy | C02F 1/12 203/11 |
| 2012/0292176 | A1 | * | 11/2012 | Machhammmer | B01D 5/006 203/10 |
| 2015/0353385 | A1 | * | 12/2015 | Wang | B01D 71/62 210/640 |
| 2017/0101764 | A1 | | 4/2017 | Vaughen | |
| 2018/0202412 | A1 | | 7/2018 | Yang | |

OTHER PUBLICATIONS

Giwa et al., "Recent Advances in Humidification Dehumidification (HDH) Desalination Processes: Improved Designs and Productivity," *Renewable and Sustainable Energy Reviews*, 57, 929-944, 2016.

Kabeel et al., "Water Desalination Using a Humidification-Dehumidification Technique—A Detailed Review," *Natural Resources*, 4: 286-305, 2013.

Okazaki et al., "Concept Study of Wind Power Utilizing Direct Thermal Energy Conversion and Thermal Energy Storage," *Renewable Energy*, 83: 332-338, 2015.

Roberts, et al., "Impacts of Desalination Plant Discharges on the Marine Environment: A Critical Review of Published Studies," *Water Research*, 44: 5117-5128, 2010.

Siddiqui, et al., "Performance Evaluation of Variable Pressure Humidification-Dehumidification Systems," *Desalination*, 409: 171-182, 2017.

Srithar and Rajaseenivasan, "Recent Fresh Water Augmentation Techniques in Solar Still and HDH Desalination—A Review," *Renewable and Sustainable Energy Reviews*, 82: 629-644, 2018.

Subramani & Jacangelo, "Emerging Desalination Technologies for Water Treatment: A Critical Review," *Water Research*, 75: 164-187, 2015.

Yang, "Pressure Effect on an Ocean-Based Humidification-Dehumidification Desalination Process," *Desalination*, 468: 114056, 2019.

Zarzo and Prats, "Desalination and Energy Consumption. What Can We Expect in the Near Future?" *Desalination*, 427: 1-9, 2018.

* cited by examiner

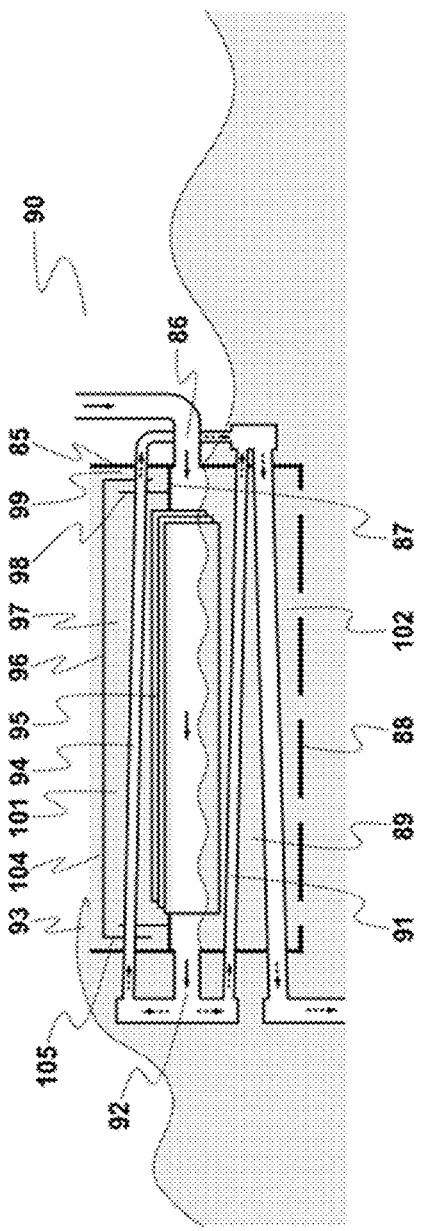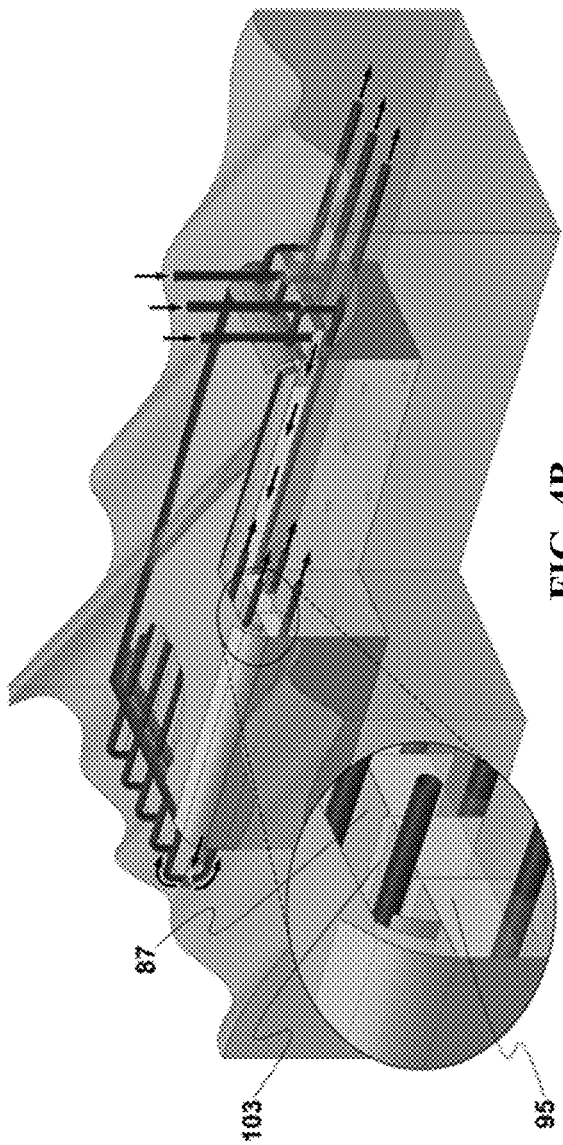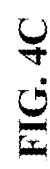
FIG. 4A
FIG. 4B
FIG. 4C

DESALINATION DEVICE

CROSS REFERENCE TO RELATED APPLICATIONS

This application claims priority to U.S. Provisional Application 62/778,465 filed Dec. 12, 2018, which is incorporated herein by reference in its entirety.

STATEMENT REGARDING FEDERALLY FUNDED RESEARCH

None.

BACKGROUND OF THE INVENTION

A. Field of the Invention

The invention generally concerns devices and processes for desalination of saltwater.

B. Description of Related Art

Scarcity of freshwater has been worsening due to population growth, industrialization, contamination of available freshwater resources, and climate change. From 2012 to 2019, water crises have consistently featured among the top five most impactful global risks in the World Economic Forum's annual reports. At present, over a half of the world's population (4 billion people) lives under conditions of severe water scarcity for at least one month a year. By 2050, this population could increase to 75%.

In contrast to the scarcity of freshwater, seawater is about 97% of the Earth's water, making it an overly abundant and inexhaustible resource for freshwater production. And, currently over 40% of the global population lives within 100 km of the coast. Obviously, low-cost and environment-friendly seawater desalination could effectively address the water stress issue to this large population in coastal regions worldwide.

To date, a large variety of desalination technologies, including conventional and emerging ones, have been proposed, investigated, or installed for freshwater production. In general, desalination technologies can be classified into membrane-based technologies and thermal-based ones according to the principle of operation (Subramani and Jacangelo, *Water Research*, 2015). Some technologies are particularly suited for large-scale desalination (≥100 m$^3$/day, with the largest desalination plant reaching 624,000 m$^3$/day); operating them in a small capacity makes freshwater production on a unit volume basis too expensive. Other technologies, on the other hand, are much appreciated for small-scale applications (<100 m$^3$/day, or even down to a level of 1 L/day); their freshwater production rates are largely limited by resource and/or cost constraints. Large-scale desalination can effectively augment the supply of municipal water, whereas small-scale desalination mostly meets decentralized needs for rural areas (including islands) and isolated homes.

The most commonly used conventional large-scale desalination technologies include membrane-based reverse osmosis and thermal-based multi-stage flash, among others. Presently, reverse osmosis has the largest installed capacity worldwide, and is the most energy-efficient, but not necessarily the most cost-efficient (Elimelech and Phillip, *Science*, 2011). Small-scale desalination technologies, as opposed to the large-scale ones, are very diverse. With a particular focus on thermal-based desalination that involves the usage of gas (mostly air) as a carrier medium, the small-scale technologies include humidification-dehumidification (HDH) desalination, solar stills, and direct freshwater extraction from ambient air. HDH desalination systems are fundamentally different from solar stills and conventional distillation systems, featuring the usage of gas flows to absorb water molecules from seawater or brackish water (humidification) and transport and dump them to a freshwater collector (dehumidification).

Numerous HDH desalination systems have been explored in recent years (Giwa et al., *Renew. Sust. Energ. Rev.*, 2016). A common way to categorize them is based on the cycle configuration, which defines three categories: open-air open-water, open-air closed-water, and closed-air open-water. Most of HDH desalination systems directly utilize solar energy for heating to lower the cost. They generally operate under relatively low temperature conditions in the humidification process, relative to conventional distillation, with temperatures of inlet air and/or water being raised by a few degrees Celsius to a few tens of degrees Celsius from the ambient temperature but still below the water boiling point. The naturally existing dilute solar flux (at a level of 1000 W/m$^2$), however, can only provide limited amount of power per unite area of an absorber to compensate for the latent heat of water vaporization at a low level, largely limiting the freshwater production rates of the HDH systems.

In addition to the broadly used solar heating, wind heating has a great potential in HDH desalination, but has rarely been used. Wind heating utilizes a wind turbine to drive a thermal generator for wind-to-heat conversion rather than to drive an electric generator for wind-to-electricity conversion. A variety of wind heating technologies have been investigated in recent years (Okazaki et al., *Renewable Energy*, 2015). The primary usage is on energy storage and building heating. Most recent invention disclosures include a Russia patent RU2656515C1 and a China patent application CN105020919A, both employing a vertical-axis wind turbine to drive a set of blades inside a confined chamber to stir liquid and generate heat.

A typical HDH system has two key components—a humidifier and a dehumidifier. The humidifier can be configured in various ways employing different mechanisms, including packed bed towers, wetted-wall towers, spray towers, and bubble columns (Srithar and Rajaseenivasan, *Renewable and Sustainable Energy Reviews*, 2018). Heat and mass transfer rates on the solid boundaries and/or air-water interfaces are the major concerns in design and optimization of the humidifier. Between humidification and dehumidification lines, it has been very popular in nearly all the HDH systems that heat recovery is employed.

The carrier medium (e.g., air) is essential in HDH desalination. Either an increased temperature or a reduced pressure could largely enhance the capability of the medium to carry water molecules, which is in favor of humidification. The exact opposite is preferred in dehumidification. Therefore, both the temperature and pressure play a critical role in HDH desalination. Presently, an overly dominant majority of HDH systems operates at a varied temperature and around the ambient pressure. Only a very few investigations have analyzed HDH systems at a varied pressure (Siddiqui et al., *Desalination*, 2017). A major challenge of HDH with a varied pressure is the prohibitively high energy consumption (Yang, *Desalination*, 2019).

HDH desalination systems can be either land-based (for desalination of seawater or brackish water) or ocean-based (for seawater desalination). Land-based systems permit easy access for construction, operation and maintenance. Ocean-based systems face more challenges; the small-scale nature makes many of such designs not worth considering. For this reason, nearly all the HDH systems documented in the literature are land-based. In an attempt to directly use ocean energies (waves, currents, ocean thermal, etc.) in HDH desalination, however, a very few ocean-based HDH systems have been proposed in invention disclosures, including U.S. Pat. Nos. 4,172,767, 4,187,151 and 4,363,703.

U.S. Pat. No. 4,172,767 discloses a closed-water open-air HDH desalination system that floats on the ocean surface. The humidifier in the system contains seawater that is completely isolated from the surrounding seawater and is continuously replenished through valves. The humidifier uses solar power to raise the temperature by a few to a few tens of degree Celsius above the ambient temperature for enhanced humidification. The dehumidification process is done either at a greater water depth using ocean thermal gradients or on the surface using a water aerating system. Movement of moisture-laden air is driven by a blower, and there is no significant pressure change from the ambient pressure throughout. Other ocean-based invention disclosures on desalination, which are non-HDH, include U.S. Pat. Nos. 5,064,505, 5,186,822, 5,306,397, and 7,328,584; U.S. Publications 2010/0037651 and 2017/0101764; and Spanish Patent 2165824.

Energy consumption and associated environmental impacts are critical issues for all types of desalination technologies. Presently, large-scale desalination (e.g., reverse osmosis, multi-stage flash, etc.) consumes a huge amount of energy in the form of thermal and electric energy derived from fossil fuels, creating a large carbon footprint. Under typical desalination conditions, e.g., for seawater at 35,000 ppm salt and with 50% of seawater converted to freshwater, the theoretical minimum energy consumption that is independent of the desalination method is 1.06 kWh/m$^3$ (Elimelech and Phillip, *Science,* 2011). Current state-of-the-art seawater reverse osmosis desalination, being the most energy-efficient in market, consumes 2.5-4 kWh/m$^3$ (Zarzo and Prats, *Desalination,* 2018). In general, most desalination technologies include five typical stages—intake, pretreatment, pure water separation from seawater, post-treatment, and brine discharge. Among these stages, intake and pretreatment together consume the second most energy next to pure water separation. Therefore, enabling new desalination technologies to eliminate the intake and pretreatment stages would greatly reduce the energy consumption and capital cost. Brine is another factor worth considering. Brine is a byproduct of nearly all types of desalination processes. Direct discharge of brine to the ocean causes environmental issues (Roberts and Johnston, *Water Res.,* 2010). Appropriate handling of brine, however, leads to added cost.

There is a need for additional more energy efficient and environmentally friendly devices, systems, and methods for desalination.

SUMMARY OF THE INVENTION

Systems and methods of certain embodiments described herein provide a solution to desalination problems described for desalination of saltwater (e.g., saline water, brackish water, sea water, ocean water and the like).

Certain embodiments are directed to a desalination device, comprising: a heating unit, configured to receive a dry air stream and heat the dry air stream using one or more renewable energy sources to form a heated dry air stream; a humidifier, configured to receive the heated dry air stream, evaporate at least portion of water present in the humidifier humidifying the heated dry air stream to form a wet air stream; a cooling unit, configured to receive the wet air stream and cool the wet air stream resulting in condensation of at least a portion of the moisture present in the wet air stream to produce fresh water or a fresh water condensate and a second dry air stream; and a fresh water collection tank, configured to collect at least a portion of the fresh water. In some aspects, the humidifier can be a rolling-type humidifier. In some aspects, the humidifier can be an over-topping-type humidifier.

In certain aspects, the heating unit comprises an air powered heating device, said device comprising: a wind turbine, configured to be rotated by wind; a chamber comprising, an inlet and an outlet, the inlet is configured to allow an air stream to enter the chamber and the outlet is configured to allow a heated air stream to exit the chamber; and at least two rotors or impellers inside the chamber, the said rotors or impellers are mechanically coupled to the wind turbine, the rotors or impellers are configured to rotate with rotation of the wind turbine in a synchronized fashion to blow air against each other and heat the air inside the chamber.

In certain aspects, the heating unit comprises a water powered (e.g., wave powered, tidal powered, and/or water current powered) heating device, said device comprising: a water turbine, configured to be rotated with moving water (waves, tides and/or water currents); a chamber with an inlet and outlet, the inlet is configured to allow an air steam to enter the chamber and the outlet is configured to allow a heated air stream to exit the chamber; and at least two rotors or impellers inside the chamber, the said rotors or impellers are mechanically coupled to the water turbine, the at least two rotors or impellers are configured to rotate with rotation of the water turbine in a synchronized fashion to blow air against each other inside the chamber. In certain aspects, the water turbine comprises, (i) a vertical shaft having a proximal end configured to connect with a gear train and a distal end opposite the proximal end, wherein the gear train mechanically couples the water turbine to the at least two rotors or impellers; and (ii) a plurality of blades, the blades being (a) connected to the shaft by spokes and (b) spatially distributed axially and radially with respect to the shaft, wherein the blades are straight lift-type blades, bent lift-type blades, drag-type blades, or a combination of different types of blades, and the turbine is configured for unidirectional rotation.

In certain aspects, the heating unit comprises a water heated conduit or pipe or other heat transferring component having an elongated body that forms a lumen, the elongated body being made from a material that allows the transfer of heat to or from the exterior to interior or interior to exterior of the elongated body (i.e., a heat exchange material). The elongated body having an inlet to the lumen at a proximal end of the body and an outlet of the lumen at a distal end of the body opposite to the proximal end. The elongated body can be configured to be submerged in water, the water having an ambient temperature ranging between 5, 10, 15, 20, 25, 30, 35 to 40° C., including all values and ranges there between. The inlet being configured to allow an air stream to enter the lumen of the conduit or pipe or elongated body that absorbs at least a portion of thermal energy from the surrounding environment and transferring the heat to the air stream in the lumen of the conduit or pipe or elongated body, and the outlet configured to allow the air stream to exit the lumen of the conduit or pipe or elongated body forming a heated air stream.

In certain aspects, the heating unit comprises a solar heated conduit or pipe comprising: an elongated body forming a lumen, the body being made of or thermally connected to a solar energy absorptive material (certain aspects include a pipe cover made of optically transparent material with low thermal conductivity); and an inlet to the lumen at a proximal end of the body and an outlet of the lumen at a distal end of the body opposite to the proximal end, the inlet being configured to allow an air stream to enter the lumen of the conduit or pipe, the solar energy absorptive material is configured for absorbing solar energy and heating the air in the lumen, the outlet being configured to allow the air stream exit the lumen as a heated air stream.

In certain aspects the heating unit can include an air conduit (e.g., pipe) traversing or passing through one or more of a water heating component (an air conduit passing through water having a higher temperature than the air), air powered heating component, a water powered heating component, and/or a solar powered heating component. The heating components can be connected in series (fluidly connected by the air conduit) and configured so that an air stream flows in series (i.e., consecutively) through one or more heating component. For example the air flowing consecutively through a water heating component, a chamber of the air powered heating component, a chamber of the water powered heating component, and a lumen of solar heating component. The order, type, and combinations of the heating components (e.g., water heating component, air powered heating device, water powered heating device, and the solar heating component) can vary between different embodiments. The heating unit can comprise 0, 1, 2, 3, 4, 5, or more of 1, 2, or 3 of a water heating component, air powered heating component, water powered heating component, and/or a solar heating component.

In certain aspects, the rolling-type humidifier comprises: a chamber with an open bottom, configured to allow at least a portion of surrounding water to enter the chamber; an air inlet to the chamber, configured to allow heated dry air from the heating units to enter the chamber; a plurality of circular disks having an outer surface and spaced along horizontal axles in the chamber, the circular disks are configured to partially submerge in water in the chamber, rotate with dry air stream flow in the chamber resulting in wetting of the outer surface, and humidifying the dry air stream to form wet air stream; and an outlet to the chamber, configured to allow wet air stream to exit the chamber.

In certain aspects, the overtopping-type humidifier can contain: a top reservoir; a bottom chamber positioned below the top reservoir; a slotted wall containing a plurality of slot openings, the slotted wall is positioned between the top reservoir and the bottom chamber forming a bottom surface or floor of the top reservoir and a top surface or ceiling of the bottom chamber; and a plurality of fabric sheets extending between the top reservoir and the bottom chamber through the plurality of slot openings of the slotted wall. The top reservoir can have a partially open top forming an insulation cover. The bottom chamber can have a partially open bottom. The bottom chamber can have an air inlet and an air outlet. When in use, the overtopping-type humidifier can be partially submerged in water such as sea water and/or ocean water. The partially open top of the top reservoir is configured to allow at least a portion of surrounding water to enter the top reservoir by wave overtopping. The partially open bottom of the bottom chamber is configured to allow at least a portion of the surrounding water to enter the bottom chamber and partially fill the bottom chamber. The plurality of fabric sheets are configured to connect the water in the top reservoir to the water in the bottom chamber, where water can run between the top reservoir and the bottom chamber through the plurality of fabric sheets and form wet fabric sheets. The air inlet of the bottom chamber is configured to allow hot air from the heating unit to enter the bottom chamber, the hot air in the bottom chamber can get exposed to water running through fabric sheets and/or wet fabric sheets, and can get wet to form a wet air stream. The air outlet of the bottom chamber is configured to allow the wet air stream to exit the bottom chamber and the overtopping-type humidifier. In some aspects, the top reservoir can contain one or more heating conduits/pipes, and when in use the one or more heating conduits/pipes of the top reservoir can pass through the water in the top reservoir and hot air can be passed though the one or more conduits/pipes for enhanced humidification. In some aspects, the bottom chamber can contain one or more heating conduits/pipes, and when in use the one or more heating conduits/pipes of the bottom chamber can pass through the water in the bottom chamber and hot air can be passed though the one or more conduits/pipes for enhanced humidification.

In certain aspects, the cooling unit comprises a conduit or pipe made from a heat exchange material forming an elongated body having a lumen; and an inlet to the lumen at a proximal end of the body and an outlet from the lumen at a distal end of the body opposite to the proximal end, the conduit or pipe is configured to be submerged in water at an ambient temperature ranging between 5, 10, 15, 20, 25, 30, 35 to 40° C., including all values and ranges there between. The inlet can be configured to allow an air stream to enter the lumen of the conduit or pipe that is configured to dissipate heat from the air stream to the water and cool the air in the lumen of the conduit or pipe. The outlet can be configured to allow the cooled air exit the cooling unit.

In certain aspects, the cooling unit comprises an evaporative cooling conduit comprising an elongated body forming a lumen and having a proximal end and a distal end, the body being made from a material that conducts heat; and an inlet at the proximal end of the body and an outlet at the distal end of the body opposite to the proximal end, the evaporative cooling conduit is configured for ocean surface exposure where waves keep it wet on the outside and winds tend to blow it dry, the inlet is configured to allow a wet air stream to enter the lumen of the conduit that is configured to dissipate at least a portion of heat from the wet air stream, cooling and dehumidifying the wet air stream to produce a dehumidified air stream, the outlet is configured to allow the dehumidified air stream to exit the conduit.

Certain embodiments are directed to a method of desalination using the desalination device.

Other embodiments of the invention are discussed throughout this application. Any embodiment discussed with respect to one aspect of the invention applies to other aspects of the invention as well and vice versa. Each embodiment described herein is understood to be embodiments of the invention that are applicable to all aspects of the invention. It is contemplated that any embodiment discussed herein can be implemented with respect to any method or composition of the invention, and vice versa.

The use of the word "a" or "an" when used in conjunction with the term "comprising" in the claims and/or the specification may mean "one," but it is also consistent with the meaning of "one or more," "at least one," and "one or more than one."

The term "about" or "approximately" are defined as being close to as understood by one of ordinary skill in the art. In one non-limiting embodiment the terms are defined to be within 10%, preferably within 5%, more preferably within 1%, and most preferably within 0.5% of a measured quantity.

The use of the term "or" in the claims is used to mean "and/or" unless explicitly indicated to refer to alternatives only or the alternatives are mutually exclusive, although the disclosure supports a definition that refers to only alternatives and "and/or."

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods of making and using the same of the present invention can "comprise," "consist essentially of," or "consist of" particular ingredients, components, blends, method steps, etc., disclosed throughout the specification.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

Any embodiment disclosed herein can be implemented or combined with any other embodiment disclosed herein, including aspects of embodiments for compounds can be combined and/or substituted and any and all compounds can be implemented in the context of any method described herein. Similarly, aspects of any method embodiment can be combined and/or substituted with any other method embodiment disclosed herein. Moreover, any method disclosed herein may be recited in the form of "use of a composition" for achieving the method. It is specifically contemplated that any limitation discussed with respect to one embodiment of the invention may apply to any other embodiment of the invention. Furthermore, any composition of the invention may be used in any method of the invention, and any method of the invention may be used to produce or to utilize any composition of the invention.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of the specification embodiments presented herein.

FIGS. 4A-C. Overtopping type humidifier. (FIG. 4A) 2-D view, (FIG. 4B) 3-D cutaway view of a bench top model, (FIG. 4C) zoomed in view of the circled portion of FIG. 4B.

DETAILED DESCRIPTION OF THE INVENTION

To address the challenge of energy efficient desalination, tremendous efforts and advancements have been made in utilizing renewable energy, either directly (without converting into electricity) or indirectly (converting into electricity first). Whenever possible, direct use is advantageous over indirect use for two reasons: (i) it avoids employment of costly energy converters (e.g., photovoltaic panels in solar energy conversion, electric generators in wind and wave energy conversions, etc.); and (ii) it circumvents the associated waste of energy due to the limited conversion efficiencies. Some renewable energy sources have been directly used in desalination in the past. For HDH desalination in particular, direct use of solar energy is very common, and direct use of ocean thermal energy (mainly for cooling in dehumidification) and ocean wave energy has also been proposed by others.

Certain embodiments are directed to a desalination device capable of floating in a body of water and desalinating at least a portion of water from the body of water. In certain aspect the body of water is a salt lake, a sea, or an ocean. The device uses a humidification and dehumidification process for desalination. In certain aspect the device is fully powered with one or more renewable resources, such as solar, wind, and/or water (wave, tidal, ocean current, and ocean thermal) energies. In certain aspects, the device or the desalination process using the device, uses minimal to no electricity allowing the device to be a mechanical structure that is robust and particularly suited for harsh ocean environments. The device is capable of freshwater production on a large scale and at a relatively steady level in all weather conditions (clear or stormy, calm or windy, day or night, summer or winter).

In certain embodiments the desalination device does not use any intake and pretreatment phases. In most existing desalination technologies, an intake is needed to deliver seawater to the desalination site, and pretreatment is needed to alleviate fouling and scaling. The seawater and ocean water desalination process using the device does not produce brine, since the sea/ocean water to be desalinated is always a small portion of the open sea/ocean water, and waves, tides and ocean currents naturally drive the mixing to maintain the local salinity level nearly unchanged. These features greatly simplify the overall structure of the device and reduce the energy demand for the process.

The desalination device is capable of being towed to different sites with minimal decommission-recommission effort, making it a great fit for disaster recovery missions (e.g., alleviating shortage of potable water in coastal regions after hurricane strikes).

Figure 1:
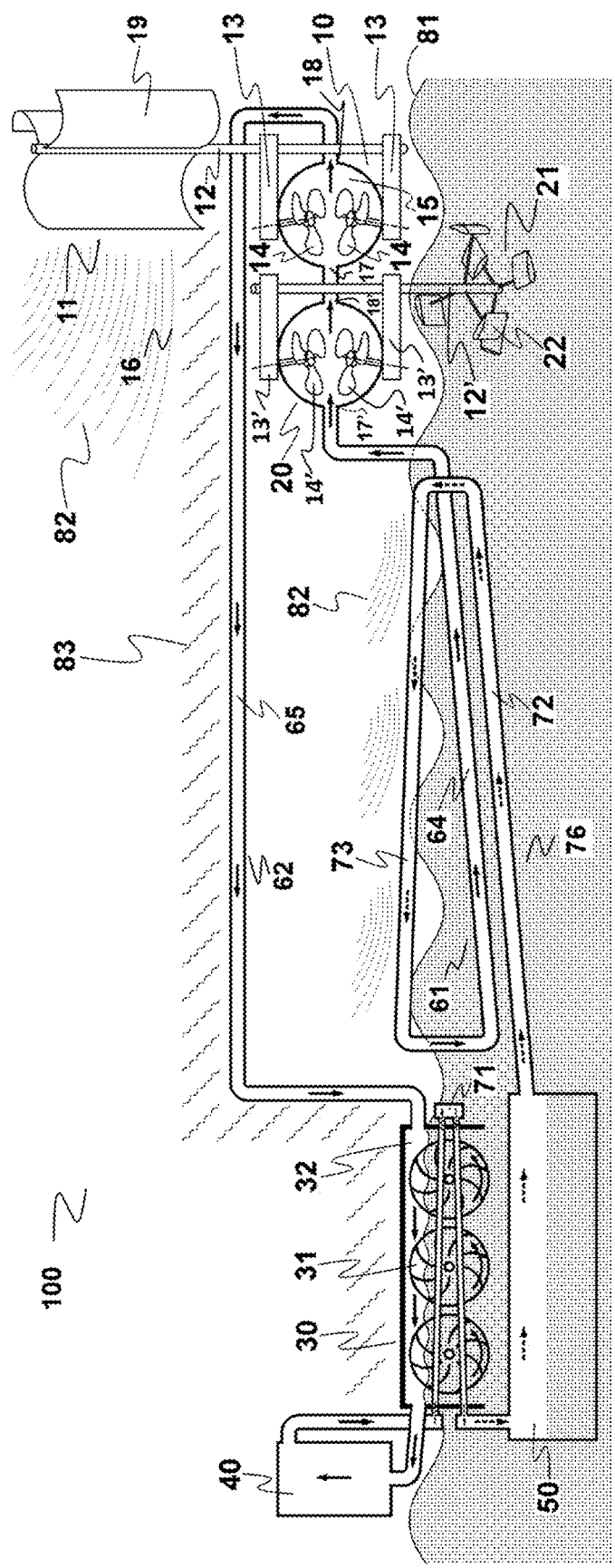
FIG. 1. Schematic of one example of a closed air/open water desalination device with air powered and water powered heating components and a rolling-type humidifier.

FIG. 1 describes an embodiment of the current disclosure. Referring to FIG. 1, a desalination device 100 and a method of desalination using the device 100 is described. The desalination device 100 can comprise a heating unit 16, a humidifier 30, a settlement chamber 40, and a cooling unit 76. Device of FIG. 1 is a closed-air open-water system.

The arrows refer the air circulation within the device during the desalination process, with solid arrows depicting heated air or air being heated, and dashed arrows depicting cooled air or air being cooled.

A dry air stream can enter the heating unit 16. The dry air stream can be heated in the heating unit 16. The heated dry air stream from the heating unit 16 can enter the humidifier 30 and can get humidified to form moisture containing wet air stream. Wet air stream from the humidifier 30 can enter the settlement chamber 40. In the settlement chamber 40 the wet air stream can move upward, allowing at least a portion of entrained heavy impurities, if any, to fall down due to gravity and return to surrounding water. Wet air stream from the settlement chamber 40 can enter the cooling unit 76. Wet air stream can get cooled and dehumidified in the cooling unit forming condensed water and dry air stream. The cooling unit can comprise a fresh water tank 50 to collect condensed water. The dry or dehumidified air from the cooling unit 76 can enter or be recycled to the heating unit 16.

The heating unit 16 can comprise, a water heated conduit segment 61, an air powered heating device/component 10, a water powered heating device/component 20 and a solar heated conduit segment 62, which, in some instances, can be connected in series and the dry air stream can flow through this portion of the device to get heated and form the heated dry air stream. The order of connecting 61, 10, 20, 62 can vary and thereby the flow of dry air stream through the units can vary and can be any order. The dry air stream temperature can be increased by the heating unit 16 by at least, equal to, or between 10, 20, 30, 40, 50, 60, 70, to 80° C., including all values and ranges there between.

The water heated conduit segment 61 can comprise various conduit segments 64. Segment 64 can submerge in warm water, such as warm surface ocean water. The conduit can be made from corrosion-resistant materials that conduct heat, that provide for exchange of heat between air inside the conduit and the environment outside the conduit, resulting in the heating the air inside the conduit 64. The water temperature can be at least, equal to, or between 10, 15, 20, 25, 30, 35, to 40° C., including all values and ranges there between.

The air powered heating device/component 10 can be a wind-thermal generator, a device that uses wind to generate heat. The air powered heating device/component 10 can comprise a vertical shaft 12, a vertical-axis wind turbine 11 that is mechanically coupled through shaft 12 to two gear trains 13 to a set of closely faced rotors or impellers 14 inside a chamber 15. The chamber 15 can comprise an inlet 17 and an outlet 18 to allow an airstream enter and exit the chamber 15. The wind turbine 11 can contain blades 19 that are axially and radially arranged around the shaft 12. The wind turbine 11 can rotate in wind 82, which is not part of the device. Rotation of the wind turbine 11 can rotate the rotors or impellers 14 in a synchronized fashion to blow air against each other and increase the air temperature inside the chamber 15. The rotation axes of the two rotors or impellers can be tilted from vertical direction or with respect each other, allowing the rotors or impellers 14 to suck air in the chamber 15 through the inlet 17, heat it up, and push it out at the outlet 18 at a desired flow rate and drive airflow through the device 100. The chamber 15 can be thermally insulated to minimize the heat loss through the chamber walls. Other types of wind-thermal generators can be used together with or in place of the air powered heating unit 10.

The water powered heating device/component 20 can be a hydro-thermal generator, a device that uses water kinetic energy to generate heat. The water powered heating device/component 20 has a vertical shaft 12', a water turbine 21 mechanically coupled through the shaft 12' to two gear trains 13' to a set of closely faced rotors or impellers 14' inside a chamber 15'. The chamber 15' can comprise an inlet 17' and an outlet 18' to allow an air stream enter and exit the chamber 15' The water turbine 21 can be place in water or underwater and can be rotated by water motion (e.g., waves, tidal flows, water currents such as ocean currents and the like). The water turbine 21 contains blades 22 that are axially and radially arranged around the shaft 12'. The water turbine 21 can rotate in water/sea/ocean wave 81, tides, ocean currents and the like, which are not part of the device. Rotation of the water turbine 21 can rotate the rotors or impellers 14' in a synchronized fashion to blow air against each other and increase the air temperature inside the chamber 15'. The rotation axes of the two rotors or impellers can be slightly tilted from vertical direction (or with respect each other), allowing the rotors or impellers 14' to suck air in the chamber 15' through the inlet 17', heat it up, and push it out the outlet 18' at a desired flow rate and drive airflow through the device 100. The chamber 15' can be thermally insulated to minimize the heat loss through the chamber walls. A vertical-axis water turbine that performs unidirectional rotation in omnidirectional water motion, is described in the U.S. patent publication 2018/0202412, which is incorporated herein by reference. The water turbine can be a water turbine as described in U.S. patent publication 2018/0202412 A1.

The solar heating unit 62 can comprise conduit segments 65, through which air can flow. The solar heating conduit segment can be made of or coated with material that absorbs solar energy, in certain aspects the conduit is further covered by glass, rendering the solar heating conduit segment capable of absorbing energy from solar irradiance 83, which is not a part of the device, and is thermally insulated well. The temperature inside the conduit can increase with absorbance of solar irradiance 83, which is not a part of the device.

The humidifier 30 can comprise an open bottom humidification chamber 32, an array of disk rollers 31 mounted on horizontal axle(s) placed inside the open-bottom humidification chamber 32. The walls of the humidification chamber 32 are made from materials with low thermal conductivity. The open bottom chamber 32 can allow at least a part of surrounding water to enter the chamber. The disk rollers 31 can partially submerge in water in the chamber 32 and can create wetted surfaces for humidification. Cloth and/or some structural patterns can be applied to the disc rollers 31 surfaces to increase the water carrying capability. A heated dry air flow from the heating unit 16 can enter the humidification chamber 30. The heated dry airflow can circulate through the humidification chamber and graze past the wetted disc roller 31 surfaces, and can absorb water from the wetted surfaces. The shear stress produced on the surfaces by the grazing airflow can automatically drive the rollers 31 to slowly rotate about their horizontal axles and continuously bring fresh wet surfaces into contact with the airflow. The open-bottom humidification chamber 32 can allow free mixing of in-chamber water and surrounding water. Such free mixing can be naturally driven by water motion due to waves, tides, and/or ocean currents, and can be further enhanced by rotation of the rollers 31. The mixing can maintain the salinity levels of water/sea water/ocean water in and out of the chamber to be nearly the same all the time.

The humidification chamber 32 can be heated from top using solar irradiance 83, which is not a part of the device, to heat the chamber and assist in humidification process. The process does not require an intake process and/or a pretreatment process, and can produce minimal or no brine just like the natural hydrologic cycle. Alternative humidifier designs can also be applied in the present invention.

The cooling unit 76 can comprise plurality of conduit segments 71, 72, 73 connected in series and a fresh water tank 50. Wet air stream can get cooled and dehumidified in conduit segments 71, 72, 73 forming condensed water and dry air stream. The conduit segments 71, 72, 73 can be oriented (e.g., tilted) to allow the condensed water to flow with gravity from the conduit segments 71, 72, 73 to the fresh water tank 50. Fresh water tank 50 can store the condensed water. 71, 72, 73 and 50 can be connected in any order. The wet air stream temperature can be decreased by the cooling unit 76 by at least, equal to, or between 10, 20, 30, 40, 50, 60, 70, to 80° C., including all values and ranges there between.

Cooling conduit segment 71 can be submerged in water in the open bottom humidification chamber 32. Body of conduit segments can be made from a material that is corrosion-resistant and thermally conductive that provide for exchange of heat between air inside the conduit and the environment outside the conduit. Heat can be dissipated from air inside the conduit segment 71 to the surrounding environment of the humidification chamber 32. Such heat dissipation can also raise the in-chamber water temperature of the humidification chamber 32, further assisting the humidification process in the humidification chamber 32. In certain aspects, the conduit segments 71 can be placed close (the distance being about a conduit diameter) to the water surface of the in-chamber water of the humidification chamber 32. The chamber 32 has an open bottom, permitting a quick mixing and exchange of the in-chamber water and with the surrounding water but in-chamber surface water can stay longer in the chamber for better heating. The conduit segments 71 inside the humidification chamber does not interfere with rotation of rollers 31 and surface wetting.

Air from conduit segment 71 can passes through the freshwater tank 50 and enter the conduit segment 72. Conduit segments 72 can be submerge in surrounding water at the ambient temperature. The water temperature can be at least, equal to, or between 5, 10, 15, 20, 25, 30, to 35° C., including all values and ranges there between. Body of conduit segments 72 can be made from a corrosion-resistant and thermally conductive material that conduct heat, that provide for exchange of heat between air inside the conduit and water outside the conduit to cool and dehumidify the air inside the conduit. Due to waves, tides, and/or ocean currents, the open-ocean water moves all the time and dissipates heat quickly, providing for very effective cooling. Special considerations can be implemented in the conduit/pipe design to increase the cooling surface and enhance condensation. Examples include stuffing the conduit/pipe with very loose three dimensional woven fabrics, employing a large number of conduits/pipes with small diameters, using fin structures, and the like (see, for example, Kabeel et al., *Natural Resources*, 2013).

Air from conduit segment 72 can enter conduit segment 73. Body of conduit segment 73 can be made from a corrosion-resistant and thermally conductive material that conduct heat, that provide for exchange of heat between air inside the conduit and air and/or water outside the conduit. The conduit segment can be positioned on, or just above the water surface and the outside surface of the conduit can be wetted with water from waves. Wind enhanced evaporation of wetted surface can cool the air inside the conduit.

At the end of cooling for dehumidification and the beginning of heating for humidification, the cold air has a relative humidity (RH) of nearly 100%. After going through a series of heating phases, the air temperature rises but the water content remains the same, resulting in "dry" air at a much lower RH before it enters the humidifier. At the end of humidification, the RH rises to nearly 100% at a much higher temperature, and the air carries much more water than 100% RH at a low temperature.

The air temperature change during the heating process depends on the intensities of solar irradiance, winds, and the water motion (due to waves, tides and/or ocean currents). The higher the intensities, the more temperature increase to gain. In general, the temperature increase could be between 10, 20, 30, 40, 50, to 60° C. The overall air temperature drop resulting from cooling can be equal to the overall temperature gain by heating. In some aspects, the device of FIG. 1 can be modified to include a overtopping-type humidifier in addition to or instead of the rolling-type humidifier.

Figure 2:
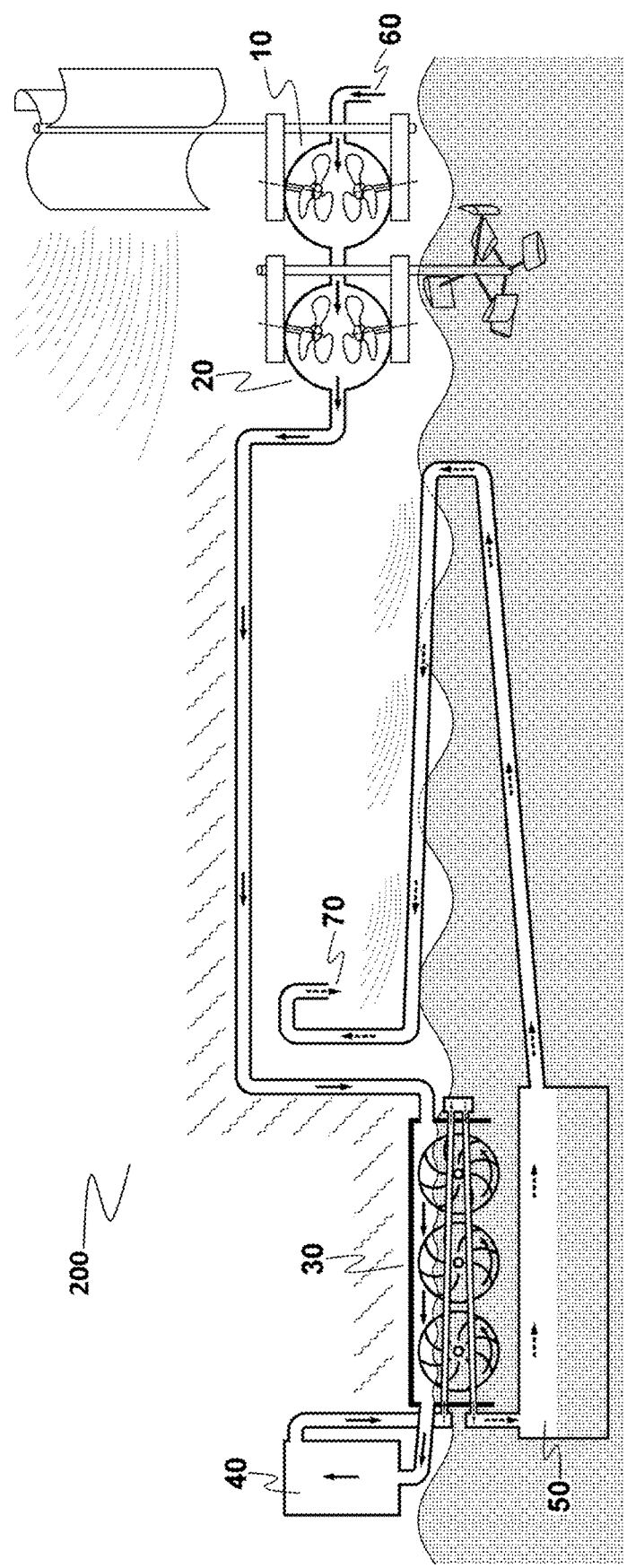
FIG. 2. Schematic of a one example of open air/open water desalination device with air powered and water powered heating components and a rolling-type humidifier.

FIG. 2 describes an alternative embodiment of the disclosure. Referring to FIG. 2, a desalination device 200 and a method of desalination using the device 200 is described. The device 200 can be similarly configured as device 100 of FIG. 1, except device 200 of FIG. 2 can be an open air, open water system, whereas device 100 of FIG. 1 is closed air, open water system. The dry air stream formed in the cooling unit of device 100 can enter the heating unit of the device for the next humidification dehumidification cycle. The dry air stream formed in the cooling unit of device 200 of FIG. 2 instead of entering the heating unit of the device can exit device. Ambient air enters the heating unit of device 200 for each humidification dehumidification cycle. In some aspects, the device of FIG. 2 can be modified to include a overtopping-type humidifier in addition to or instead of the rolling-type humidifier.

Figure 3:
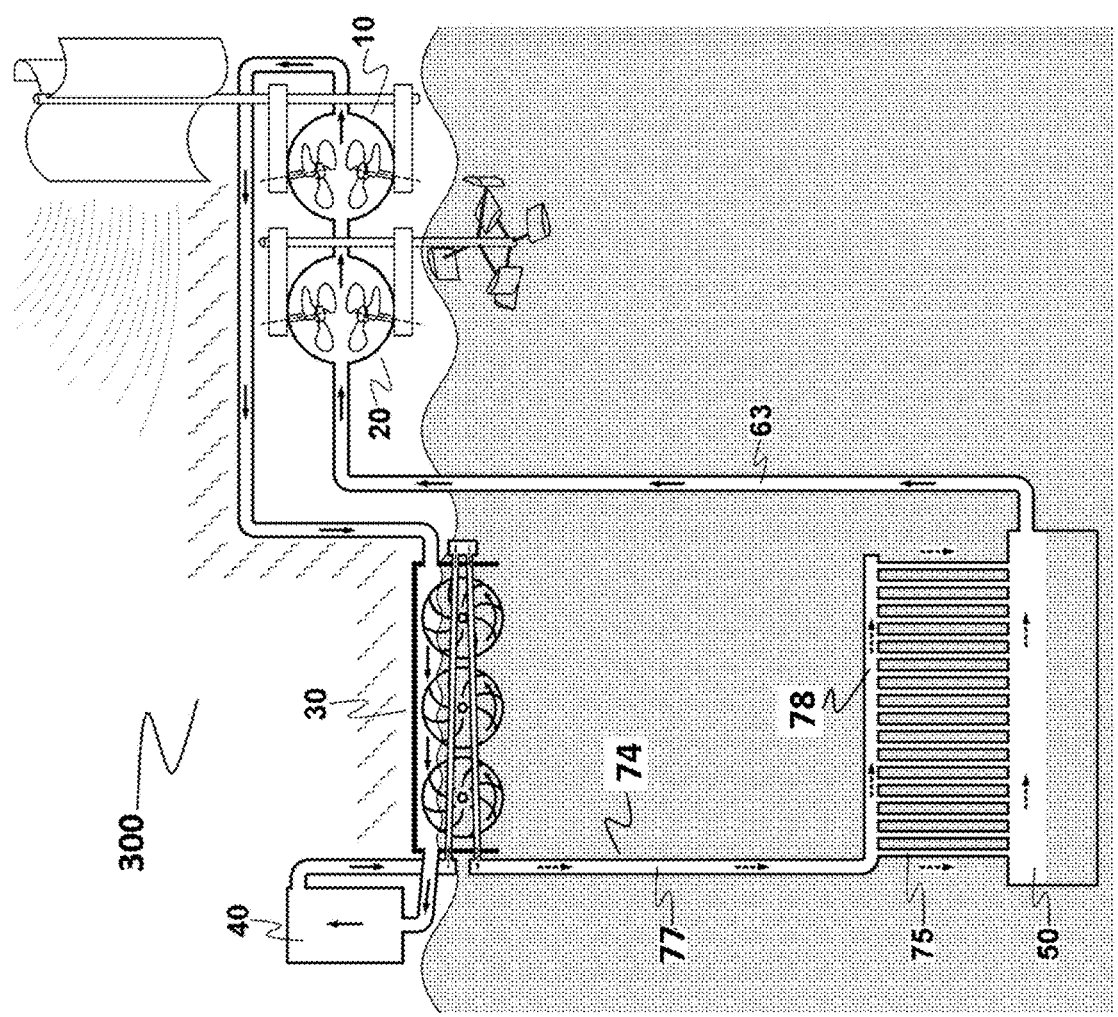
FIG. 3. Schematic of one example of a deep water closed air/open water desalination device with air powered and water powered heating components, deep water cooling and a rolling-type humidifier.

FIG. 3 describes an alternative embodiment of the current disclosure. Referring to FIG. 3, a desalination device 300 and a method of desalination using the device 300 is described. The device 300 can be similarly configured as device 100 of FIG. 1, except the cooling unit conduit segments 74 and 75 of device 300 are configured to place the fresh water tank to a depth of 200 m to 500 m under the water surface. The body of conduit segments 74 and 75 can be made from a corrosion-resistant and thermally conductive material that provide for exchange of heat between air inside the conduit and water outside the conduit. The conduit segment 74 can comprise a vertical segment 77 and a horizontal segment 78. The vertical segment 77 can connect to the segment 71 at a proximal end and to the horizontal segment 78 at a distal end opposite to the proximal end. 75 contains a plurality of vertically arranged conduits, connecting the horizontal segment 78 to the fresh water tank 50. Conduit segment 75 is configured to reach a depth of water where cold water is largely abundant, allowing effective cooling of air inside conduit segment 75. After cooling and dehumidification the dry air can be circulated back to heating unit 16 with vertical conduit 63. Air inside conduit 63 can gradually warm up, with the temperature reaching the ambient temperature at the ocean surface. A similar approach has been taught in the U.S. Publication 2017/0101764, which is incorporated herein by reference. In certain aspects, the device of FIG. 3 can also be modified to form an open-air open-water system. In some aspects, the device of FIG. 3 can be modified to include a overtopping-type humidifier in addition to or instead of the rolling-type humidifier.

FIG. 4 shows an overtopping type humidifier 90. The overtopping-type humidifier 90 can contain side walls 85, a slotted wall 87 and a partially open bottom 88. The walls 85, the slotted wall 87 and the partially open bottom 88 can be made from materials with low thermal conductivity. The slotted wall 87 and the side walls 85 form a top reservoir 101. When in use, the top reservoir can be filled up with at least a portion of surrounding water such as seawater 97, by wave overtopping 93, 93 and surrounding water are not a part of the device. In some aspects, the top reservoir can get full or almost full by water. The slotted wall 87, the side walls 85, and the partially open bottom 88 can form a bottom chamber 102 beneath the top reservoir. When in use, the bottom chamber can get partially filled with a portion of the surrounding water such as seawater 89 due to a partial submersion of the humidifier 90, forming an air flow passage with an inlet 86 and outlet 92. The slotted wall can contain a plurality of slots 103, and a plurality of fabric sheets 95 can pass through the plurality of slots 103. A slot can contain a fabric sheet, leaving a small gap between each side of a fabric sheet and the adjacent slot wall. The plurality of fabric sheets 95 can reach from the in-chamber water such as seawater 97 of the top reservoir down to the in-chamber water such as seawater 89 of the bottom chamber. When in use, the top reservoir water such as seawater 97 can run through fabric sheets 95 and the small gaps and flow down along the fabric sheets 95 to the water such as seawater 89 in the bottom chamber and form wet fabric sheets. The water films formed this way on both sides of individual fabric sheets enable efficient humidification of the hot air that passes through from the inlet 86 to outlet 92. In case of a calm sea with no waves, the top reservoir can be empty or near empty, but the fabric sheets can still absorb water from the in-chamber water such as seawater 89 through diffusion and keep wet. To further enhance the humidification process, both the top reservoir water 97 and the bottom chamber water 89 can be heated by the humidified hot air running through conduits/pipes 94 and 91, respectively. To minimize the heat loss in the top reservoir, a partially open top, an insulation cover 96 can be employed. The insulation cover 96 can have a horizontal cover 104 and a vertically reaching rim 105. The vertically reaching rim 105 can sit in between the side walls 85 and a vertical shield 98 to stop the hot water such as seawater 97 to run out of the top reservoir such as through path 99, while allowing relatively cold outside seawater to go in anytime, controlled by means of natural convection. The partially open bottom 88 helps reduce the heat loss of the in-chamber seawater 89 by slowing down the water exchange with the surrounding.

Figure 5:
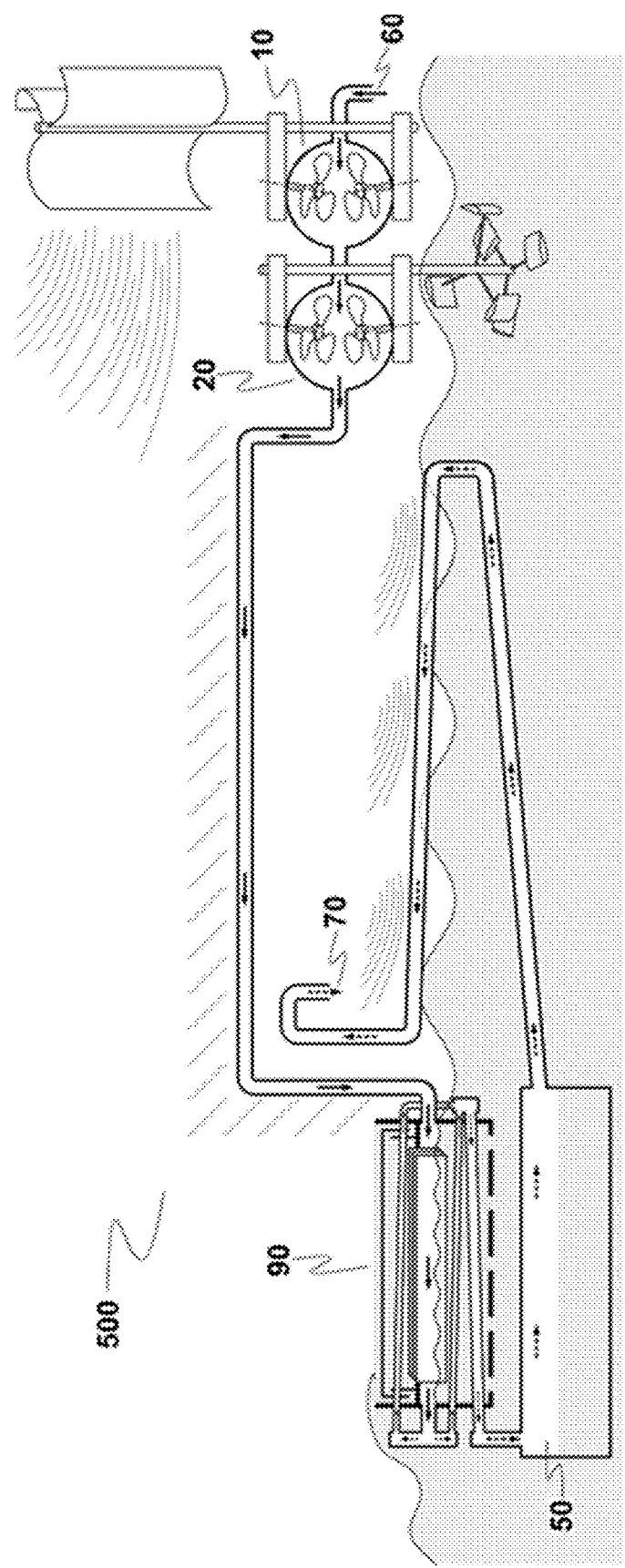
FIG. 5. Schematic of one example of open air/open water desalination device with air powered and water powered heating components and a overtopping-type humidifier.

FIG. 5 describes an alternative embodiment of the disclosure. Referring to FIG. 5, a desalination device 500 and a method of desalination using the device 500 is described. The device 500 can be similarly configured as device 200 of FIG. 2, except the device 500 includes an overtopping-type humidifier 90 of FIG. 4 instead of the rolling-type humidifier 30.

In certain embodiments the desalination device can be ocean-based. In certain aspect the device can be stationed near the coastline for easy access to the facility and low-cost distribution of freshwater. It is well known that, there exists a temperature gradient along the water depth in the ocean, with the monthly average varying site by site and month by month. For example, in August in the Gulf of Mexico, the monthly average temperature is around 30° C. on the ocean surface and drops to 4° C. at a depth of 1000 m according to data from the National Data Buoy Center of NOAA. In some favorable sites, a large temperature drop (e.g., 20° C.) can be even achieved in a short depth range (e.g., within 200 m).

The examples illustrated in FIG. 1 FIG. 2 and FIG. 5 can be applied in coastal waters. The example illustrated in FIG. 3 can be applied for coastal sites where cold deep water is available for cooling. Along the coastlines, most coastal water within 10 km from the coastline has a water depth of less than 100 m. This is particularly true for coastal water near heavily populated coastal regions. Within such a water depth, the water temperature does not change much from the free surface to the seabed and water with a sufficient drop in temperature may be unavailable.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

The invention claimed is:

1. An ocean-situated desalination device, comprising:
   a water or air powered heating unit, configured to receive a dry air stream and heat the dry air stream to form a heated dry air stream;
   a humidifier, configured to receive the heated dry air stream, evaporate at least portion of water present in the humidifier and humidify the heated dry air stream to form a wet air stream;
   a cooling unit, configured to receive the wet stream and cool the wet air stream resulting in condensation of at least a portion of moisture present in wet air stream to produce fresh water and dehumidified air stream; and
   a fresh water collection tank, configured to collect at least a portion of the fresh water.

2. The device of claim 1, wherein the heating unit comprises an air-powered heating component comprising:
   a wind turbine, configured to be rotated by wind;
   a chamber comprising, an inlet and an outlet, the inlet is configured to allow an air steam enter the chamber and the outlet is configured to allow an air stream exit the chamber; and
   at least two rotors or impellers inside the chamber, the said rotors or impellers are mechanically coupled to the wind turbine, the rotors or impellers are configured to rotate with rotation of the wind turbine in a synchronized fashion to blow air against each other and heat air inside the chamber.

3. The device of claim 1, wherein the heating unit comprises a water-powered heating component comprising:
   a water turbine, configured to be rotated by waves, tides and/or water currents;

a chamber with an inlet and outlet, the inlet is configured to allow an air stream enter the chamber and the outlet is configured to allow an air stream exit the chamber; and at least two rotors or impellers inside the chamber, the said rotors or impellers are mechanically coupled to the water turbine, the at least two rotors or impellers are configured to rotate with rotation of the water turbine in a synchronized fashion to blow air against each other and air inside the chamber.

4. The device of claim 3, wherein the water turbine comprises:
(i) a vertical shaft having a proximal end configured to mechanically couple the water turbine to the at least two rotors or impellers and a distal end opposite the proximal end; and
(ii) a plurality of blades, the blades being (a) connected to the shaft by spokes and (b) spatially distributed axially and radially with respect to the shaft; wherein the blades are straight lift-type blades, bent lift-type blades, drag-type blades, or a combination of different types of, and the turbine is configured for unidirectional rotation.

5. The device of claim 1, wherein the heating unit comprises an open ocean water heated conduit comprising:
an elongated body made from a material that conducts heat, the elongated body forming a lumen; and
an inlet at a proximal end of the body and an outlet at a distal end of the body opposite to the proximal end, water heated conduit is configured to be submerged in open ocean water with temperature between 5 to 40° C., the inlet is configured to allow an air stream to enter the lumen of the conduit where the air absorbs at least a portion of thermal energy of the water via heat exchange across the conduit heating the air stream in the lumen of the conduit, the outlet is configured to allow the air stream to exit the lumen of the conduit.

6. The device of claim 1, wherein the humidifier is a rolling-type humidifier and the rolling-type humidifier comprises:
a chamber with an open bottom configured to allow at least a portion of surrounding water to enter the chamber and partially fill the chamber forming an air filled portion above a water filled portion;
an air inlet to the air filled portion of the chamber configure to allow the heated dry air stream from the heating unit to enter the chamber;
a plurality of disks having an outer surface and spaced along horizontal axles in the chamber, the disks are configured to partially submerge in the water in the water filled portion of the chamber and to rotate resulting in wetting of the outer surface of the disks, the wetted disks humidify the dry air stream to form the wet air stream; and
an outlet to the chamber, configured to allow the wet air stream to exit the chamber.

7. The device of claim 1, wherein the humidifier is an overtopping-type humidifier and the overtopping-type humidifier comprises:
a top reservoir comprising a partially open top cover;
a bottom chamber positioned below the top reservoir, the bottom chamber comprises a partially open bottom, an air inlet and an air outlet;
a slotted wall positioned between the top reservoir and the bottom chamber forming a bottom surface of the top reservoir and a top surface of the bottom chamber, the slotted wall comprises a plurality of slot openings; and
a plurality of fabric sheets extending between the top reservoir and the bottom chamber through the plurality of slot openings of the slotted wall,
wherein during use, the overtopping-type humidifier is partially submerged in surrounding water and the partially open top cover of the top reservoir is configured to allow at least a portion of the surrounding water to enter the top reservoir by wave overtopping, the partially open bottom of the bottom chamber is configured to allow at least a portion of surrounding water to enter the bottom chamber and partially fill the bottom chamber, the plurality of fabric sheets are configured to connect water inside the top reservoir with the water inside the bottom chamber and form wet fabric sheets, the air inlet of the bottom chamber is configured to allow the heated dry air stream from the heating unit to enter the bottom chamber and contact the heated dry air stream with the wet fabric sheets to form the wet air stream, and the air outlet of the bottom chamber is configured to allow the wet air stream to exit the bottom chamber and the overtopping-type humidifier.

8. The device of claim 1, wherein the cooling unit comprises an open ocean water cooled conduit comprising:
an elongated body forming a lumen and having a proximal end and a distal end, the body being made from a material that conducts heat; and
an inlet at the proximal end of the body and an outlet at the distal end of the body opposite to the proximal end;
the water-cooled conduit is configured to be submerged in open ocean water with temperature between 5 to 40° C., the inlet is configured to allow the wet air stream to enter the lumen of the conduit that is configured to dissipate at least a portion of heat from the wet air stream, cooling and dehumidifying the wet air stream to produce a dehumidified air stream, the outlet is configured to allow the dehumidified air stream to exit the conduit.

9. The device of claim 1, wherein the cooling unit comprises an evaporative cooling conduit comprising:
an elongated body forming a lumen and having a proximal end and a distal end, the body being made from a material that conducts heat; and
an inlet at the proximal end of the body and an outlet at the distal end of the body opposite to the proximal end,
the evaporative cooling conduit is configured for ocean surface exposure where waves keep the evaporative cooling conduit wet on the outside and winds blow the evaporative cooling conduit dry, the inlet is configured to allow the wet air stream to enter the lumen of the conduit that is configured to dissipate at least a portion of heat from the wet air stream, cooling and dehumidifying the wet air stream to produce a dehumidified air stream, the outlet is configured to allow the dehumidified air stream to exit the conduit.

10. A method of desalination comprising deploying the device of claim 1 into a body of salt water to obtain fresh water.

11. A desalination device, comprising:
a heating unit, configured to receive a dry air stream and heat the dry air stream with one or more renewable energy sources to form a heated dry air stream, wherein the heating unit comprises (i) a water turbine, configured to be rotated by waves, tides and/or water currents; (ii) a chamber with an inlet and outlet, the inlet is configured to allow an air stream enter the chamber and the outlet is configured to allow an air stream exit the chamber; and (iii) at least two rotors or impellers inside the chamber, the said rotors or impellers are mechanically coupled to the water turbine, the at least two rotors or impellers are configured to rotate with rotation of the water turbine in a synchronized fashion to blow air against each other and air inside the chamber;

a humidifier, configured to receive the heated dry air stream, evaporate at least portion of water present in the humidifier and humidify the heated dry air stream to form a wet air stream;

a cooling unit, configured to receive the wet stream and cool the wet air stream resulting in condensation of at least a portion of moisture present in wet air stream to produce fresh water and dehumidified air stream; and a fresh water collection tank, configured to collect at least a portion of the fresh water.

12. The device of claim 11, wherein the water turbine comprises:
(i) a vertical shaft having a proximal end configured to mechanically couple the water turbine to the at least two rotors or impellers and a distal end opposite the proximal end; and
(ii) a plurality of blades, the blades being (a) connected to the shaft by spokes and (b) spatially distributed axially and radially with respect to the shaft; wherein the blades are straight lift-type blades, bent lift-type blades, drag-type blades, or a combination of different types of, and the turbine is configured for unidirectional rotation.

13. The device of claim 11, wherein the heating unit comprises an open ocean water heated conduit comprising:
an elongated body made from a material that conducts heat, the elongated body forming a lumen; and
an inlet at a proximal end of the body and an outlet at a distal end of the body opposite to the proximal end, water heated conduit is configured to be submerged in open ocean water with temperature between 5 to 40° C., the inlet is configured to allow an air stream to enter the lumen of the conduit where the air absorbs at least a portion of thermal energy of the water via heat exchange across the conduit heating the air stream in the lumen of the conduit, the outlet is configured to allow the air stream to exit the lumen of the conduit.

14. The device of claim 11, wherein the humidifier is a rolling-type humidifier and the rolling-type humidifier comprises:
a chamber with an open bottom configured to allow at least a portion of surrounding water to enter the chamber and partially fill the chamber forming an air filled portion above a water filled portion;
an air inlet to the air filled portion of the chamber configure to allow the heated dry air stream from the heating unit to enter the chamber;
a plurality of disks having an outer surface and spaced along horizontal axles in the chamber, the disks are configured to partially submerge in the water in the water filled portion of the chamber and to rotate resulting in wetting of the outer surface of the disks, the wetted disks humidify the dry air stream to form the wet air stream; and
an outlet to the chamber, configured to allow the wet air stream to exit the chamber.

15. The device of claim 11, wherein the humidifier is an overtopping-type humidifier and the overtopping-type humidifier comprises:
a top reservoir comprising a partially open top cover;
a bottom chamber positioned below the top reservoir, the bottom chamber comprises a partially open bottom, an air inlet and an air outlet;
a slotted wall positioned between the top reservoir and the bottom chamber forming a bottom surface of the top reservoir and a top surface of the bottom chamber, the slotted wall comprises a plurality of slot openings; and
a plurality of fabric sheets extending between the top reservoir and the bottom chamber through the plurality of slot openings of the slotted wall,
wherein during use, the overtopping-type humidifier is partially submerged in surrounding water and the partially open top cover of the top reservoir is configured to allow at least a portion of the surrounding water to enter the top reservoir by wave overtopping, the partially open bottom of the bottom chamber is configured to allow at least a portion of surrounding water to enter the bottom chamber and partially fill the bottom chamber, the plurality of fabric sheets are configured to connect water inside the top reservoir with the water inside the bottom chamber and form wet fabric sheets, the air inlet of the bottom chamber is configured to allow the heated dry air stream from the heating unit to enter the bottom chamber and contact the heated dry air stream with the wet fabric sheets to form the wet air stream, and the air outlet of the bottom chamber is configured to allow the wet air stream to exit the bottom chamber and the overtopping-type humidifier.

16. The device of claim 11, wherein the cooling unit comprises an open ocean water cooled conduit comprising:
an elongated body forming a lumen and having a proximal end and a distal end, the body being made from a material that conducts heat; and
an inlet at the proximal end of the body and an outlet at the distal end of the body opposite to the proximal end;
the water-cooled conduit is configured to be submerged in open ocean water with temperature between 5 to 40° C., the inlet is configured to allow the wet air stream to enter the lumen of the conduit that is configured to dissipate at least a portion of heat from the wet air stream, cooling and dehumidifying the wet air stream to produce a dehumidified air stream, the outlet is configured to allow the dehumidified air stream to exit the conduit.

17. The device of claim 11, wherein the cooling unit comprises an evaporative cooling conduit comprising:
an elongated body forming a lumen and having a proximal end and a distal end, the body being made from a material that conducts heat; and
an inlet at the proximal end of the body and an outlet at the distal end of the body opposite to the proximal end,
the evaporative cooling conduit is configured for ocean surface exposure where waves keep the evaporative cooling conduit wet on the outside and winds blow the evaporative cooling conduit dry, the inlet is configured to allow the wet air stream to enter the lumen of the conduit that is configured to dissipate at least a portion of heat from the wet air stream, cooling and dehumidifying the wet air stream to produce a dehumidified air stream, the outlet is configured to allow the dehumidified air stream to exit the conduit.

* * * * *